US008866351B2

(12) United States Patent
Le Besnerais

(10) Patent No.: US 8,866,351 B2
(45) Date of Patent: Oct. 21, 2014

(54) COOLING ARRANGEMENT FOR AN ELECTRIC MACHINE

(75) Inventor: Jean Le Besnerais, Mons en Baroeul (FR)

(73) Assignee: Siemens Aktiengesellschaft, Munich (DE)

( * ) Notice: Subject to any disclaimer, the term of this patent is extended or adjusted under 35 U.S.C. 154(b) by 245 days.

(21) Appl. No.: 13/455,458

(22) Filed: Apr. 25, 2012

(65) Prior Publication Data

US 2012/0274159 A1 Nov. 1, 2012

(30) Foreign Application Priority Data

Apr. 27, 2011 (EP) .................................. 11163912

(51) Int. Cl.
  *H02K 9/19* (2006.01)
  *H02K 9/22* (2006.01)
  *H02K 1/20* (2006.01)
  *H02K 7/18* (2006.01)

(52) U.S. Cl.
  CPC .. *H02K 9/22* (2013.01); *H02K 9/19* (2013.01); *Y02E 10/725* (2013.01); *H02K 1/20* (2013.01); *H20K 9/10* (2013.01); *H02K 7/1838* (2013.01)
  USPC .................................. 310/58; 310/59; 310/54

(58) Field of Classification Search
  CPC .................................. H02K 9/19; H02K 5/20
  USPC .................................................. 310/54, 58, 59
  See application file for complete search history.

(56) References Cited

U.S. PATENT DOCUMENTS

| 2,618,756 | A | | 11/1952 | Fechheimer | |
|---|---|---|---|---|---|
| 2,768,511 | A | * | 10/1956 | Moody | ........................... 62/505 |
| 2,873,393 | A | | 2/1959 | Baudry | |
| 2,917,644 | A | | 12/1959 | Laffoon | |
| 3,755,702 | A | | 8/1973 | Willyoung | |
| 4,362,959 | A | | 12/1982 | Bartheld | |
| 2002/0149273 | A1 | * | 10/2002 | Soitu et al. | ...................... 310/58 |
| 2003/0102730 | A1 | * | 6/2003 | Balas | .............................. 310/58 |

(Continued)

FOREIGN PATENT DOCUMENTS

| CH | 310332 A | 10/1955 |
|---|---|---|
| DE | 1231797 B | 1/1967 |

(Continued)

OTHER PUBLICATIONS

Translation of foreign document DE 3031421 A (Year: 1982).*
European Search Report dated Jul. 22, 2011, pp. 1-11.

*Primary Examiner* — Alex W Mok

(57) ABSTRACT

The electric machine includes a stator. The stator includes stacked lamination plates. The lamination plates form at least two lamination packages. The electric machine includes a first cooling circulation with a first cooling fluid. The stator of the electric machine includes a second cooling circulation with a second cooling fluid. A heat exchanger is part of the second cooling circulation and is arranged to connect the first cooling circulation and the second cooling circulation. Thus heat is transferred from the first cooling fluid to the second cooling fluid. A spacer element is arranged between the two lamination packages. The spacer element is prepared to set a predetermined distance between the lamination packages, thus the first cooling fluid is allowed to flow between the lamination packages. The heat exchanger arrangement is an integral or at least partly integrated part of the spacer elements.

13 Claims, 4 Drawing Sheets

(56) References Cited

U.S. PATENT DOCUMENTS

| | | |
|---|---|---|
| 2005/0035673 A1* | 2/2005 | Lafontaine et al. ............. 310/58 |
| 2006/0022529 A1* | 2/2006 | De Filippis et al. ............ 310/58 |
| 2007/0210656 A1* | 9/2007 | Lafontaine et al. ............. 310/58 |
| 2008/0168796 A1* | 7/2008 | Masoudipour et al. ......... 62/505 |
| 2010/0102656 A1* | 4/2010 | Booth et al. .................... 310/64 |
| 2010/0237727 A1* | 9/2010 | Mantere .......................... 310/64 |
| 2010/0289349 A1 | 11/2010 | Barnes et al. |

FOREIGN PATENT DOCUMENTS

| | | |
|---|---|---|
| DE | 2913972 A1 | 10/1980 |
| DE | 3031421 A1 | 2/1982 |
| DE | 102009017325 A1 | 10/2010 |
| EP | 0893871 A2 | 1/1999 |
| EP | 1050949 A1 | 11/2000 |

* cited by examiner

COOLING ARRANGEMENT FOR AN ELECTRIC MACHINE

CROSS REFERENCE TO RELATED APPLICATIONS

This application claims priority of European Patent Office application No. 11163912.6 EP filed Apr. 27, 2011. All of the applications are incorporated by reference herein in their entirety.

FIELD OF INVENTION

The invention relates to a cooling arrangement for an electric machine.

BACKGROUND OF INVENTION

The efficiency of an electric machine depends on the losses in the machine. Losses occur as Joule losses or iron losses for example. The losses are released as heat.

In large permanent magnet direct drive generators these losses come from copper losses in stator conductors. The losses result in high temperature in the coils and especially in the winding overhang that is surrounded by air.

The stator winding temperature must be kept low to avoid decreasing the insulation lifetime, so an efficient cooling system is of prime importance.

It is knows from the prior art to cool the winding overhang and the air gap with air guided through the winding overhang and the air gap.

It is also known to cool electric machines with a liquid. Liquid cooling is a cheap way to increase the cooling capacity, but leakages may lead to electrical problems in the machine. Especially the cooling in wind turbine generators must be reliable and compact.

It is known from the prior art to cool the lamination of an electric machine by guiding a cooling liquid within a duct through the lamination packages of the stator.

SUMMARY OF INVENTION

These systems provide a cooling, which is only optimized for the lamination package. Or the known systems are only optimized to cool the winding overhang and the air gap. Thus the cooling systems are not optimized for both purposes and are thus not efficient.

A cooling arrangement, which is more efficient and optimized to cool the winding overhang and the lamination of the electric machine is described.

The electric machine comprises a stator. The stator comprises stacked lamination plates. The lamination plates form at least two lamination packages. The electric machine comprises a first cooling circulation with a first cooling fluid. The stator of the electric machine comprises a second cooling circulation with a second cooling fluid. A heat exchanger is part of the second cooling circulation and is arranged to connect the first cooling circulation and the second cooling circulation. Thus heat is transferred from the first cooling fluid to the second cooling fluid.

A spacer element is arranged between the two lamination packages. The spacer element is prepared to set a predetermined distance between the lamination packages, thus the first cooling fluid is allowed to flow between the lamination packages. The heat exchanger arrangement is an integral or at least partly integrated part of the spacer elements.

Heat from the first fluid is transferred to the second fluid. The second fluid is circulated within the lamination of the electrical machine. Thus there is no need to guide the first fluid, such as air, out of the machine to remove the heat. An external heat exchanger is no longer required.

In addition the length of the circulation-path of the first fluid (like air) is reduced in view to the prior art known. Thus pressure, which is needed to force the first fluid through the machine, is even reduced. Thus dimensions of needed components are reduced.

The lamination plates may comprise a gap, that is prepared to support a winding of a coil. The winding extends over the lamination packages in longitudinal direction of the stator to form a winding overhang.

The heat exchanger arrangement may comprise several heat exchanger elements.

The heat exchanger element may include a duct for the second fluid. Thus the heat exchanger element is cooled by the second fluid.

The surface of the heat exchanger element may be enlarged to provide an increased heat-transfer, wherein a fin-shaped enlargement is used preferably. Thus the heat transfer from the first fluid to the second fluid is increased.

Each of the lamination plates may comprise at least one opening. Thus a continuous duct is formed within the lamination package. Thus the second fluid flows in the duct and cools the lamination packages in the electric machine.

The duct of the lamination package may be connected with the duct in the heat exchanger element. Thus the second fluid is guided through the lamination package and the heat exchanger element.

A pipe may be arranged within the duct of the lamination package and within the duct of the heat exchanger element to guide the second fluid. Thus the second fluid is guided in a fluid tight circulation. Electrical problems within the electric machine are avoided.

A number of lamination packages may be arranged in a way that they form at least a sector of the stator. The sector is supported by at least two plates, which are finger plates preferably. The second fluid is guided through the plates into the ducts or pipes in the lamination packages. Thus no additional connections, ducts or manifolds to connect the ducts or pipes in the lamination with the inlet or outlet for the second fluid are needed. Thus even problems with un-tight connections and electrical problems are avoided. The second fluid can not leak into the electric machine.

Even thermal problems, which may arise within the machine by leaking cooling fluids, are avoided.

The finger plate may be casted. Thus constructional means for guiding the second fluid can be integrated in the finger plate during the production of the plate.

Those means can be means for connecting the inlet and outlet of the second fluid, connecting the ducts or pipes of the lamination packages or channels for distributing the second fluid from the inlet to the ducts or pipes. Thus fewer connections and pipes have to be mounted to the finger plate. Thus the risk of untight connections is reduced.

The finger plate may be connected to the lamination with a fluid-tight joint or a sealing. Thus the connection is fluid-tight.

The second fluid may be a liquid. Thus the heat transport is improved, as a liquid with a high heat capacity can be used.

The liquid may be chosen in a way that it shows specific electrical insulation properties. Thus no electrical problems, like short circuits, are caused if a leakage in the cooling circuit of the second fluid may occur.

In one embodiment the liquid is an oil.

The first fluid may be a gas. Thus a gas circulation does not need guiding means that are completely fluid tight. Even no electrical problems will occur in the case of a leakage.

The electric machine comprises a rotor and a stator with an air gap between the rotor and the stator. A winding overhang is present at the end of the stator. The first cooling circulation is arranged to direct the gas through the winding overhang, through the air gap and along the heat exchanger elements. Thus the gas cools the winding overhang and the surface of the rotor and the stator adjacent to the air gap. The thermal energy is transferred to the second cooling circulation by the gas passing the heat exchanger elements. Thus the winding overhang and the rotor and the stator side of the air gap are cooled by the gas and the gas is cooled by the heat exchanger.

The gas may be moved by a fan. Preferably the fan is also located close to the lamination package and the heat exchanger. Thus the circulation for the gas is short and the pressure needed to force the air trough the air gap is reduced.

The electrical machine may be a generator, such as a wind turbine generator or a generator for a direct drive wind turbine.

The cooling arrangement may be used as a cooling system for an electric machine, such as a wind turbine generator or a direct drive wind turbine.

The rotor may be equipped with permanent magnets and the permanent magnets are cooled by the first fluid flowing through the air gap.

BRIEF DESCRIPTION OF THE DRAWINGS

The invention is shown in more detail by help of figures. The figures show preferred configurations and do not limit the scope of the invention.

DETAILED DESCRIPTION OF INVENTION

Figure 1:
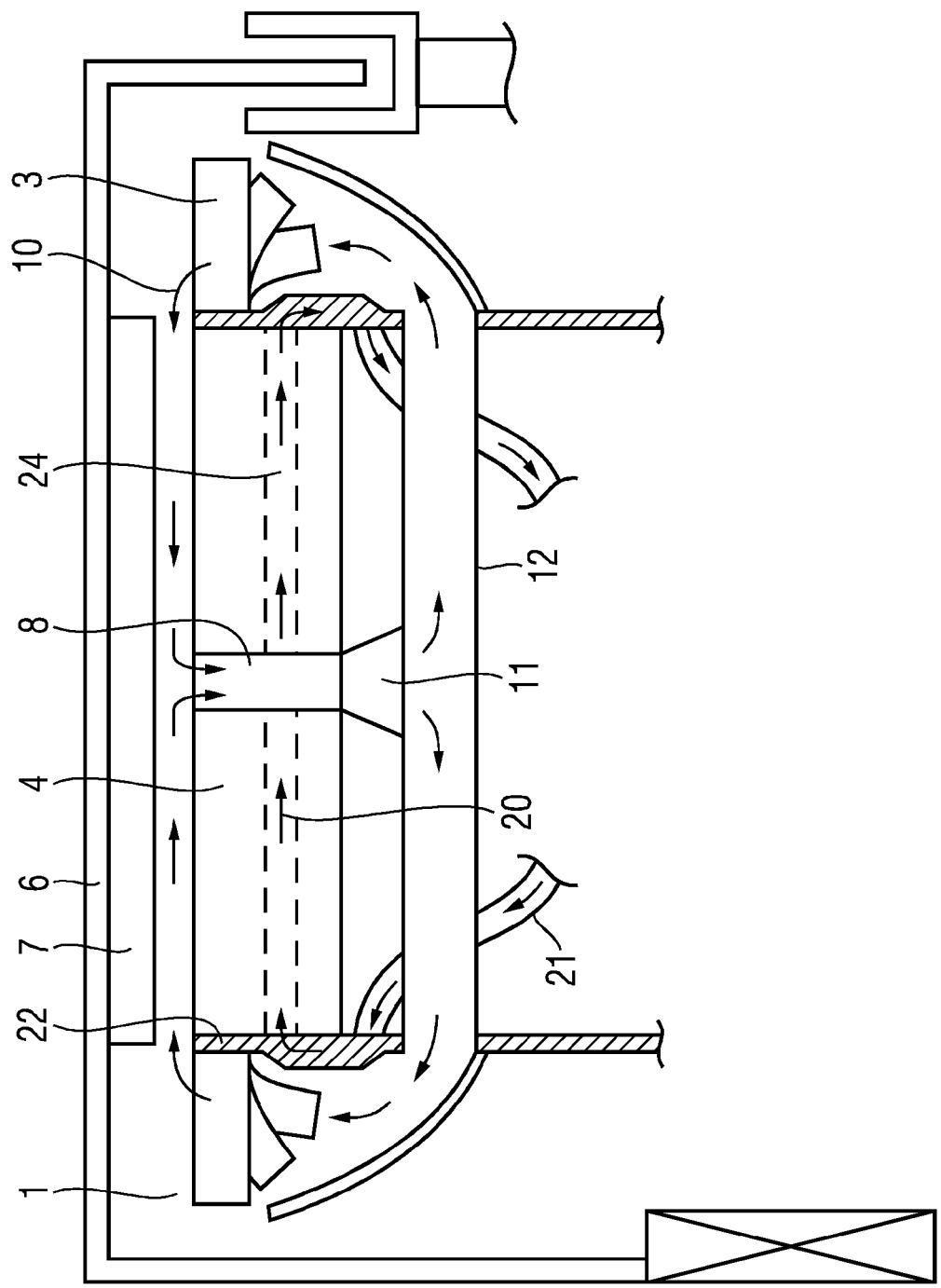
FIG. 1 illustrates a longitudinal cut through a generator.

FIG. 1 shows a longitudinal cut through a generator with a rotor 6 with permanent magnets 7 and a stator 1 with a lamination package 4. The winding overhang 3 is visible at both ends of the stator. An air flow 10 is guided through the winding overhang 3 through the air gap between the rotor and the stator, through a space in the lamination where the air to oil heat exchanger 8 is an integral part of the spacer, through a fan 11, that is installed at the spacer opposite the air gap, and through air guides 12 outward to the winding overhangs. An oil flow 20 is guided through an oil inlet pipe 21, though a finger-plate 22, through a cooling duct 24 in the lamination 4, through the air to oil heat exchanger 8 in a space in the lamination 4, though a finger plate and an oil outlet pipe out of the stator.

When the air is passing the winding overhangs and inwards through the air gap it is cooling the winding overhang and the air gap with the windings and the surface of the lamination in the first side of the air gap and the magnets on the second side of the air gap while it is heated up. The hot air is then passing through the heat exchanger that is cooled by the oil flowing through the duct in the lamination and the heat exchanger. The cooled down air is passing through a fan that forces the air through air guides outward to the winding overhang again. The heat is transported out of the generator by the hot oil.

Figure 2:
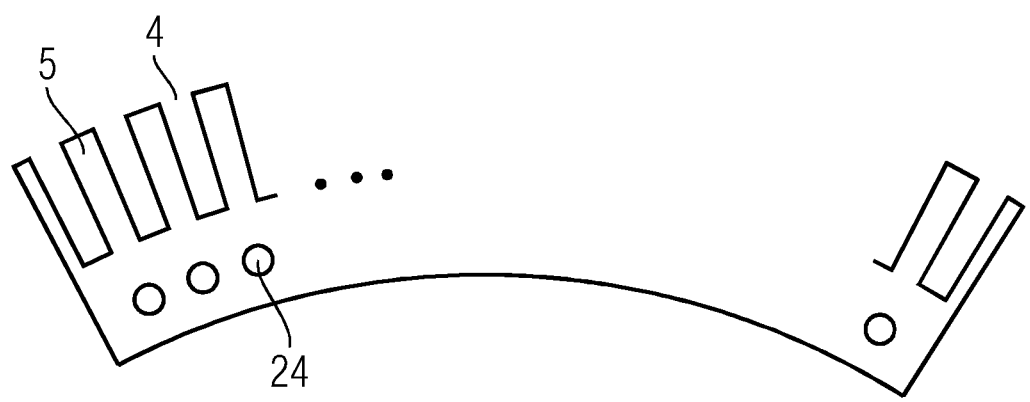
FIG. 2 illustrates a cut through the lamination stack.

FIG. 2 shows a cut through the lamination stack. The lamination 4 provides the stator teeth 5 and the gaps between the teeth that hold the stator windings. Below the teeth and the gaps are openings that are prepared to be used as an oil duct 24 or a space for a pipe that contains the cooling fluid.

Figure 3:
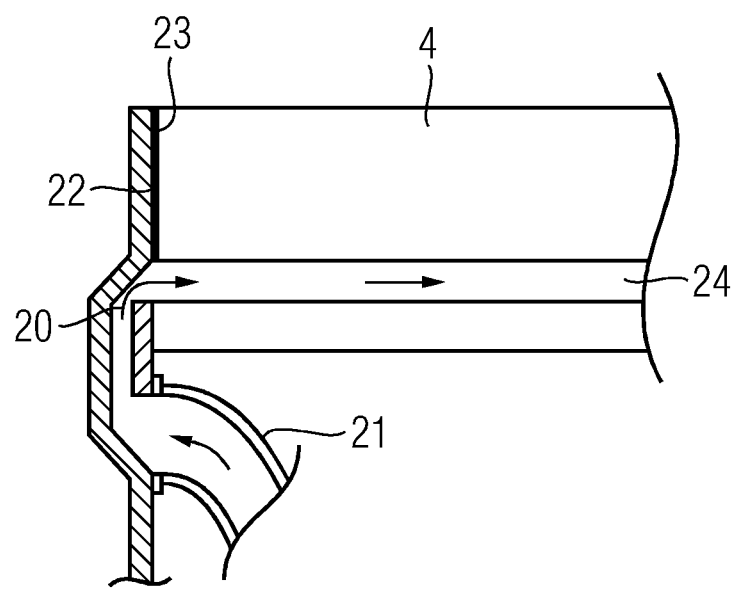
FIG. 3 illustrates a longitudinal cut through of an end of the stator.

FIG. 3 shows a longitudinal cut through a detail of the one end of the stator, where the finger plate 22 is connected to the lamination-stack. An oil inlet duct 21 is connected to the finger plate 22 to allow cooling liquid to flow into the finger-plate 22. The finger plate 22 has a duct that is prepared to allow the cooling liquid to flow into the oil cooling duct 24 in the lamination 4. The finger plate 22 is connected to the lamination 4 by the use of a joint or a sealing 23 to provide a mainly fluid-tight connection.

Figure 4:
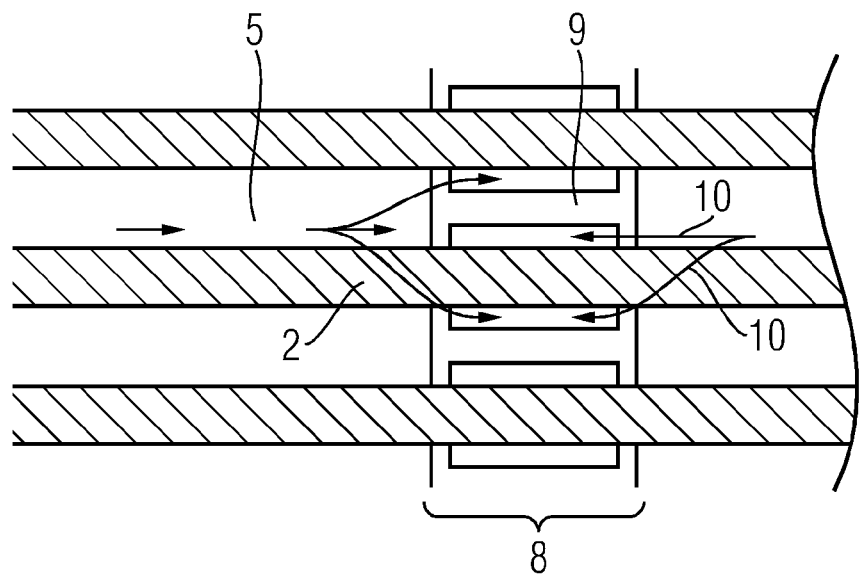
FIG. 4 illustrates top aerial view of stator.

FIG. 4 shows the surface of the stator 1 as seen from the air gap. The windings 2 are located between the teeth 5 of the lamination. Between two packages of lamination is a space where the air is allowed to flow between the two stacks of lamination from the air gap into the stator to the fan. The windings 2 continue through the space from one stack of lamination to the other stack of lamination. Between the windings the space in the lamination provides an opening from the air gap through the stator. In these openings the spacers are located. The heat exchanger elements of the air to oil heat exchanger are an integral part of these spaces. Seen from the side of the air gap the spacer with the air to oil heat exchanger elements are H-shaped providing a pressure plate at both ends where it touches the lamination and the fin 9 of the heat exchanger element between the pressure plates. The air flows along the air gap from both ends of the stator and flows through the openings provided by the air to oil heat exchanger elements 8 through the opening in the lamination.

Figure 5:
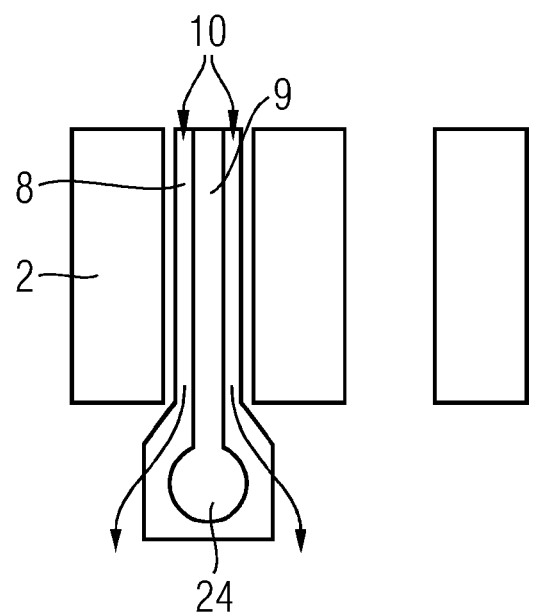
FIG. 5 illustrates a cut through the windings.

FIG. 5 shows a cut through the windings 2 and one of the air to oil heat exchanger element 8 in the opening of the lamination. The air flow 10 enters the opening from the air gap. The air is flowing along the fin through the opening provided and around the duct 24, through which the oil is flowing. Flowing along the surface of the heat exchanger element the air heats the heat exchanger element and is thus loosing thermal energy. The heat exchanger element is cooled by the oil flowing through the duct 24.

Figure 6:
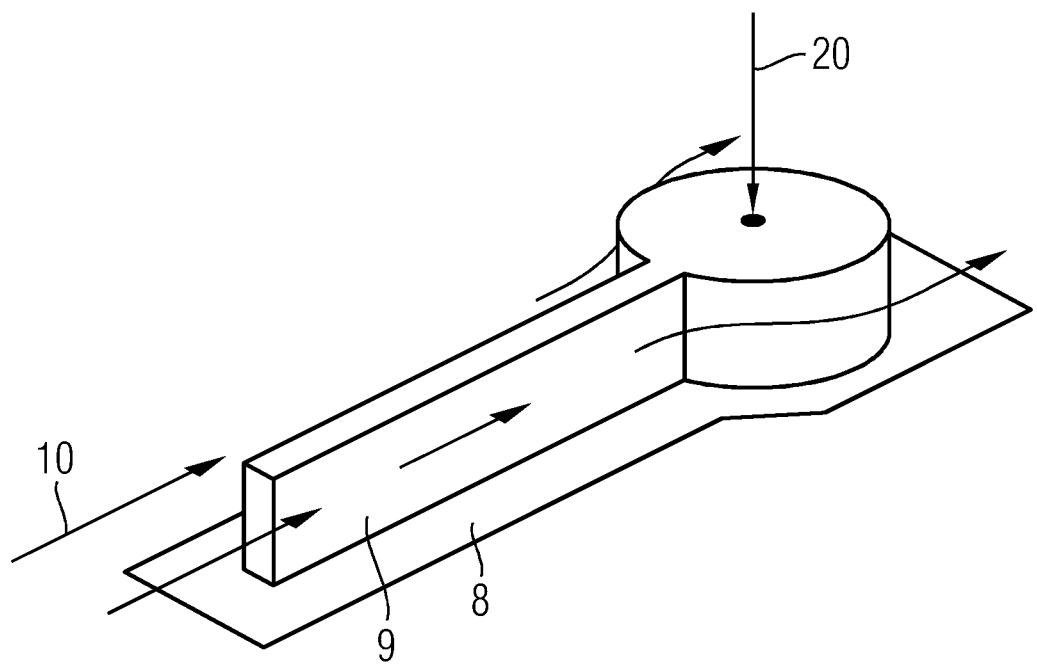
FIG. 6 illustrates a perspective view of one the heat exchange elements.

FIG. 6 shows a perspective view of one of the heat exchanger elements 8. The air flow 10 flows along the fin 9 of the element 8 and around the round end or the element 8 that provides the cooling oil duct to allow the oil flow 20 through the heat exchanger element 8. One of the pressure plates is shown on one end of the heat exchanger element. The second pressure plate is not shown.

The invention claimed is:

1. A cooling arrangement for an electric machine
wherein the electric machine comprises a stator,
wherein the stator comprises stacked lamination plates,
wherein the lamination plates form at least two lamination packages,
wherein the electric machine comprises a first cooling circulation with a first cooling fluid,
wherein the stator of the electric machine comprises a second cooling circulation with a second cooling fluid,
wherein a spacer element is arranged between the two lamination packages, the spacer element configured to set a predetermined distance between the lamination packages, whereby the first cooling fluid is allowed to flow between the lamination packages, and wherein a heat exchanger, which is an integral part of the spacer elements, is arranged to connect the first cooling circulation and the second cooling circulation to transfer heat from the first cooling fluid to the second cooling fluid, wherein the heat exchanger includes a first duct for the second cooling fluid, wherein the lamination plates comprise an opening therethrough, which defines a continuous second duct for the second cooling fluid within the lamination package, wherein the second duct is flow connected with the first duct, whereby the second cooling fluid is guided consecutively through the lamination package and the heat exchanger in one common continuous conduit.

2. The cooling arrangement according to claim 1,
wherein the lamination plates comprise a gap,
wherein the gap is prepared to support a winding of a coil, and
wherein the winding extends over the lamination packages in longitudinal direction of the stator to form a winding overhang.

3. The cooling arrangement according to claim 1,
wherein the heat exchanger comprises plurality of heat exchanger elements.

4. The cooling arrangement according to claim 3,
wherein the surface of the heat exchanger element is enlarged to provide an increased heat-transfer.

5. The cooling arrangement according to claim 4,
wherein the enlarged is a fin-shaped enlargement.

6. The cooling arrangement according to claim 1,
wherein a pipe is arranged within the second duct of the lamination package and within the first duct of the heat exchanger to guide the second fluid.

7. The cooling arrangement according to claim 1,
wherein a number of lamination packages are arranged in a way that they form at least a sector of the stator,
wherein the sector is supported by at least two plates, and
wherein the second fluid is guided through the plates into the second duct in the lamination packages.

8. The cooling arrangement according to claim 7,
wherein the at least two plates are finger plates.

9. The cooling arrangement according to claim 1,
wherein the second fluid is a liquid.

10. The cooling arrangement according to claim 1,
wherein the first fluid is a gas.

11. The cooling arrangement according to claim 10
wherein the electric machine comprises a rotor with an air gap between the rotor and the stator, and
wherein the first cooling circulation is arranged to direct the gas through a winding overhang, through the air gap and along the heat exchanger elements, thereby the gas cools the winding overhang and the surface of the rotor and the stator adjacent to the air gap and transfers the thermal energy to the second cooling circulation by passing the heat exchanger.

12. The cooling arrangement according to claim 1,
wherein the electrical machine is a generator.

13. The cooling arrangement according to claim 1,
wherein the electrical machine is a wind turbine generator.

* * * * *